United States Patent [19]

Schedrin et al.

[11] 3,907,170

[45] Sept. 23, 1975

[54] MACHINE FOR APPLICATION OF POWDERLIKE MATERIAL ONTO LINING OR SURFACE OF STRUCTURE

[76] Inventors: Ivan Vasilievich Schedrin, ulitsa Lomonosova, I, kv. 22; Vladimir Ilich Shakhlin, ulitsa Lenina, 60/I, kv. 51, both of Magnitogorsk, U.S.S.R.; Anatoly Samuilovich Freidenberg, ulitsa Malysheva, III, kv. 57, Sverdlovsk, U.S.S.R.; Gennady Elizarovich Ovchinnikov, ulitsa Kalinina, 3, kv. 85, Magnitogorsk, U.S.S.R.; Alexei Grigorievich Trifonov, ulitsa Pushkina, 30, kv. 14, Magnitogorsk; Fedor Timofeevich Melnikov, ulitsa Stroitelei, 6, kv. 12, Magnitogorsk, U.S.S.R.; Andrei Dmitrievich Filatov, ulitsa Oktyabrskaya, 15, kv. 7, Magnitogorsk, U.S.S.R.; Vladimir Fedorovich Gazhur, ulitsa Lomonosova, 6, kv. 24, Magnitogorsk, U.S.S.R.; Timofei Grigorievich Shunin, poselok Dzerhinskogo, ulitsa Dzhambula, 16, Magnitogorsk, U.S.S.R.; Mikhail Moiseevich Privalov, Bolshaya Dekabrskaya ulitsa, 3, korpus 14, kv. 49, Moscow, U.S.S.R.; Anatoly Ivanovich Konovalov, ulitsa Lenina, 5, kv. 47, Sverdlovsk, U.S.S.R.; Andrei Lvovich Garyaev, deceased, late of Moscow, U.S.S.R.; by Nina Andreevna Garyaev, administrator; by Marina Andreevna Garyaeva, administrator, both of ulitsa Lizy Chaikinoi, 6, kv. 46, Moscow, U.S.S.R.

[22] Filed: July 9, 1973

[21] Appl. No.: 377,779

Related U.S. Application Data

[63] Continuation of Ser. No. 65,483, Aug. 20, 1970, abandoned.

[52] U.S. Cl. .................. 222/135; 222/193; 118/308
[51] Int. Cl. ...................... B05b 7/04; B05b 7/06
[58] Field of Search .................. 118/303, 308, 312; 239/428, 434.5, 335, 336; 302/20, 50, 51; 198/64; 222/193, 413, 194, 135

[56] References Cited
UNITED STATES PATENTS

| | | | |
|---|---|---|---|
| 1,997,897 | 4/1935 | Conley | 239/336 X |
| 2,568,499 | 9/1951 | Hood | 118/305 X |
| 2,929,436 | 3/1960 | Hampshire | 118/303 X |
| 3,029,000 | 4/1962 | Kobee | 118/308 X |
| 3,130,913 | 4/1964 | Shelton | 118/308 X |
| 3,155,530 | 11/1964 | Schnedler | 118/312 X |
| 3,333,774 | 8/1967 | Demaison | 239/428 |
| 3,633,650 | 1/1972 | Schaumburg | 118/308 X |

Primary Examiner—John P. McIntosh
Attorney, Agent, or Firm—Waters, Schwartz & Nissen

[57] ABSTRACT

A machine for the application of powderlike material onto lining or surface of a structure, wherein an outlet chamber of a screw feeder and a receiving chamber of a manipulator shaft are fashioned as jet pumps in which the powderlike material serves as the medium being pumped and compressed air - as the conveying medium.

5 Claims, 1 Drawing Figure

US Patent   Sept. 23,1975   3,907,170
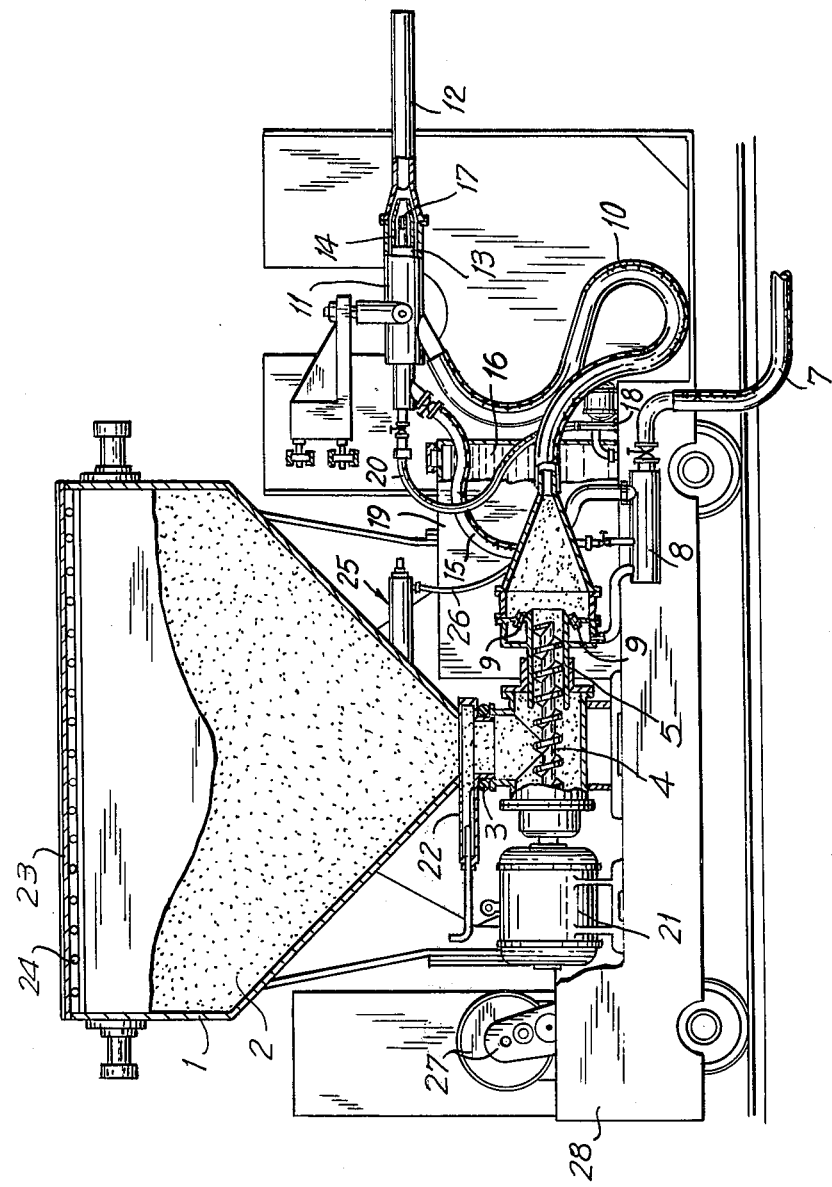

MACHINE FOR APPLICATION OF POWDERLIKE MATERIAL ONTO LINING OR SURFACE OF STRUCTURE

This application is a continuation of co-pending application Ser. No. 65,483, filed Aug. 20, 1970, now abandoned.

The present invention relates to machines for the application of powderlike material onto the lining or surfaces of a structure.

This invention can be most advantageously used in the manufacture and repair of linings of metallurgical furnaces, for example, open-hearth, furnaces and other heating units, however, it can as well be used in the building industry for manufacturing, reinforcing and coating the surface of various structures.

Known at present are machines for the application of moistened powderlike material onto the surfaces of structures, wherein a hopper for powderlike material communicates with the receiving chamber of a manipulator shaft with the aid of a vertically extending screw feeder arranged in said hopper and serving to feed the material, and a chamber at the outlet of said feeder. The feeder chamber is cone-shaped, expanding upwardly, while the manipulator shaft is essentially a horizontally arranged headpiece with a nozzle arranged therein, communicating with a centrifugal disk effecting the feed of the material from the headpiece, compressed air being supplied to the latter (cf., U.S.S.R. Inventor's Certificate No. 185,040, class 37d, 21/12, issued in 1965).

In the known machines, the feed of powderlike material and of compressed air is effected in mutually perpendicular directions and, as a result, a reduced consumption of air or an increased rate of material feed cause clogging at the point where the jets of air and material converge. This brings clogging of the outlet pipe and, consequently, about interruption of the continuity of the process of discharging the powderlike material.

Moreover, said known machines feature inadequate efficiency (up to 5 tons per hour), nonuniform moistening of the jet of powderlike material, increased abrasion and wear of rotating parts and considerable consumption of compressed air and electric energy are required to overcome friction and cohesion between the particles of the jet of material.

A number of disadvantages of the above-described known machines can be eliminated by the use of screw pumps communicated with a source of compressed air and widely used in cement making. However, said latter pumps can only be used for the application of powderlike material having grains with a maximum size of 0.5 to 0.8 mm.

The present invention is directed to the solution of a technical problem of developing a machine for the application of powderlike material, even with relatively large grains onto surfaces of structures, featuring such a design of the feeder and manipulator shaft chambers as would make for a high efficiency and provide for the continuity of the process of discharging the powderlike material, its uniform moistening and adequate dense laying of the moistened material onto the surface.

The problem faced by the invention can be solved through the provision of a machine in which the hopper for powderlike material communicates with the receiving chamber of the manipulator shaft by means of a screw feeder with an outlet chamber, wherein, according to the invention, said chambers are essentially jet pumps in which the powderlike material serves as the medium being pumped and compressed air as the conveying medium.

Such an embodiment provides for the continuity of the process of discharging a uniform jet of powderlike material.

It is expedient that the manipulator shaft be provided with a means adapted to feed thereinto a fluid serving as a moistening and additional conveying medium for the powderlike material. This provides for uniform moistening of the jet of powderlike material and for improved binding of the material with the surface.

The machine according to the invention features a high efficiency of up to 50 tons per hour. When using the machine of the invention for the manufacture and repair of linings of open-bearth furnaces, the time of melting is reduced by 5–8 minutes, the consumption of materials required for linings being reduced by 6–8 kg/m of steel.

For a better understanding of the present invention a description of the preferred embodiment thereof is given hereinbelow with due reference to the accompanying drawing the sole FIGURE of which shows a side elevational view of a machine according to the invention, in longitudinal section.

Now, referring to the drawing, the machine of the invention comprises a hopper 1 for powderlike material 2 under whose outlet opening 3 is arranged a horizontally extending screw feeder 4. Said feeder is placed in a housing 5 and has at its outlet a chamber 6 which is essentially a jet pump. The medium being pumped in this pump is the material 2 supplied from the feeder 4, while the conveying medium is compressed air supplied from the main (not shown in the drawing) via hose 7, manifold 8 and nozzles 9 arranged at acute angle to the longitudinal axis of the feeder 4 and chamber 6. The feed of compressed air and the movement of the powderlike material in one direction inside the outlet chamber 6 provides for a uniform flow of the material.

The outlet chamber 6 is connected with the aid of a flexible hose 10 to a receiving chamber 11 of a manipulator shaft 12. This latter chamber is essentially a jet pump in which the medium being pumped is the powderlike material coming to a conduit 13 of the chamber 11 via the hose 10. Serving as the conveying medium in this pump is compressed air coming to a conduit 14 from the manifold 8 via hose 15. The feed of the powderlike material and compressed air inside the manipulator shaft is effected at an acute angle to the longitudinal axis of the latter.

In order to provide for uniform moistening of the jet of powderlike material, the manipulator shaft 12 is provided with a means adapted to feed thereinto a fluid 16, said means being essentially a central conduit 17 to which the fluid 16 is fed by a pump 18 from a tank 19 via hose 20. The fluid 16 serves as a moistening and additional conveying medium for the powderlike material in the receiving chamber 11 of the manipulator shaft 12. This fluid also serves as a mixing agent for the material. Owing to uniform moistening of the jet of material, constant properties of the layer being applied are attained, its binding with the surface is improved and its dense laying onto the surface is attained, accompanied with reduced losses of material.

The screw feeder 4 is actuated from an electric motor 21.

The outlet opening 3 of the hopper 1 is closed by a shutter 22. The material 2 is introduced into the hopper 1 through a net 23 placed above a grating 24 mounted in the top portion of said hopper.

The machine of the invention is provided with a pneumatic vibrator 25 serving to preclude possible hanging of the material 2 in the hopper 1. Said vibrator is actuated by compressed air supplied from the manifold 8 via hose 26.

When the machine is to be used for manufacture and repair of linings of open-hearth furnaces, it is mounted on a carriage 28 displaceable by means of a drive 27, whereby the machine can be moved along the furnace.

In the course of the machine operation, the material 2 is poured into the hopper 1 through the net 23 and grating 24. Via the hose 7 and nozzles 9 compressed air is supplied to the outlet chamber 6 of the feeder 4, whereas via the hose 15 compressed air is supplied to the conduit 14 of the receiving chamber 11 of the manipulator shaft 12. Thereupon, the pump 18 is actuated and the fluid mixing agent 16 is supplied via the hose 20 to the central conduit 17 of the manipulator shaft 12. Following this, the electric motor 21 is switched on and the screw feeder 4 starts rotating. Simultaneously, the shutter 22 is removed from the opening 3 of the hopper 1, and the material 2 gets onto the rotating screw feeder. With the aid of the latter feeder, the material 2 is conveyed to the outlet chamber 6 jet pump. In this pump the material 2 is subjected to aeration and is fed via the hose 10 to the conduit 13 of the chamber 11 of the manipulator shaft 12.

Due to the fact that the chamber 11 is essentially a jet pump, and due to the supply of the fluid, mixing agent 16, along the conduit 17, in the manipulator shaft 12 there forms an aerated flow of the mixing agent.

From the manipulator shaft 12 the uniform and moistened flow of the material is applied in a dense layer onto the surface of structures or onto the lining of a furnace.

We claim:

1. A machine for the application of powderlike material onto the lining or surfaces of a structure, comprising: a hopper for powderlike material; a screw feeder arranged below said hopper and having an outlet; an outlet chamber coaxially arranged at the outlet of said feeder and constituting a jet pump in which the medium being pumped is the powderlike material supplied from said screw feeder and the conveying medium is compressed air; means for feeding compressed air to said jet pump, nozzles in said outlet chamber, said nozzles being connected to the means which feeds compressed air, said outlet chamber having a longitudinal axis in the direction of which said powderlike material is supplied, said nozzles being arranged at an acute angle with respect to said longitudinal axis; a manipulator shaft; said manipulator shaft having a receiver chamber with a longitudinal axis, means connecting said receiver chamber to said outlet chamber, said receiver chamber of the manipulator shaft being constituted as a jet pump in which the medium being pumped is the powderlike material supplied from said outlet chamber of the feeder and the conveying medium is compressed air; means for feeding compressed air to the receiver chamber of the manipulator shaft as said conveying medium and comprising a straight tubular conduit mounted within the receiver chamber of the manipulator shaft and extending along the axis of said receiver chamber to the rear end thereof, and an inlet for compressed air at the rear end of said tubular conduit, the powderlike material supplied from the outlet chamber of the feeder flowing around said straight conduit for the compressed air, a second tubular conduit coaxially mounted within the first tubular conduit and extending therealong to the rear end of the receiver chamber, and means at said rear end of the tubular conduit for feeding to said second conduit a fluid serving as a moistening and additional conveying medium for said powderlike material.

2. A machine as set forth in claim 1 comprising a common manifold for the compressed air feed means to said outlet chamber and the compressed air feed means to the receiver chamber.

3. A machine as set forth in claim 2 further comprising a vibration means coupled to said hopper for vibrating the same, said vibration means being coupled to said common manifold to be actuated by compressed air therefrom.

4. A machine as set forth in claim 1 wherein said means connecting said receiver chamber to said outlet chamber comprises a flexible hose.

5. A machine as set forth in claim 4 wherein said outlet chamber has an outlet end and includes a portion which conically tapers in narrowing fashion from said screw feeder to said outlet end, said hose being connected to said outlet end.

* * * * *